United States Patent
Bodin et al.

[11] Patent Number: 5,418,962
[45] Date of Patent: May 23, 1995

[54] VIDEO DISPLAY ADAPTER CONTROL SYSTEM

[75] Inventors: William K. Bodin, Boca Raton, Fla.; Dale R. Whitfield, London, United Kingdom

[73] Assignee: International Business Machines Corporation, Armonk, N.Y.

[21] Appl. No.: 40,701

[22] Filed: Mar. 31, 1993

[51] Int. Cl.⁶ .................................. G06F 3/153
[52] U.S. Cl. ........................ 395/700; 395/162; 364/DIG. 1; 364/237.3; 364/247
[58] Field of Search ............... 395/153, 161, 162, 164, 395/325, 700

[56] References Cited

U.S. PATENT DOCUMENTS

| | | | |
|---|---|---|---|
| 4,990,904 | 2/1991 | Zenda | 340/771 |
| 4,991,085 | 2/1991 | Pleva et al. | 364/200 |
| 5,072,411 | 12/1991 | Yamaki | 395/162 |
| 5,138,706 | 8/1992 | Melo et al. | 395/500 |
| 5,150,109 | 9/1992 | Berry | 340/811 |
| 5,257,387 | 10/1993 | Richek et al. | 364/DIG. 1 |
| 5,263,148 | 11/1993 | Jones, Jr. et al. | 364/DIG. 1 |
| 5,313,592 | 5/1994 | Buondonno et al. | 364/DIG. 1 |

FOREIGN PATENT DOCUMENTS 2023669A 12/1991 Canada .
WO91/15841 10/1991 WIPO .......................... G09G 1/16

OTHER PUBLICATIONS

IBM Technical Disc. Bulletin vol. 31, No. 3, Aug. 1988 "Use of EGA SR Register for Improved Performance and Appearance of AP Character Displaying for Selected Color Combinations" pp. 364–366.

IBM Technical Disc. Bulletin vol. 30, No. 12, May 1988 "Dynamic Video Mode Independence From Monitor Type" pp. 286–288.

IBM Technical Disc. Bulletin vol. 34, No. 10b, Mar. 1992 "Automatic Correction of CRT Control Parameters" pp. 380–385.

IBM Technical Disc. Bulletin vol. 32, No. 11, Apr. 1990 "Display Subsystem" pp. 172–173.

IBM Technical Disc. Bulletin vol. 32, No. 4A, Sep. 1989 "Extending Video Memory Addressing" pp. 458–463.

INSPEC Abstracts.

Primary Examiner—Thomas M. Heckler
Attorney, Agent, or Firm—Bruce D. Jobse; Andrew J. Dillon

[57] ABSTRACT

A video display adapter control system is provided for utilization in a data processing system which includes a processor, data storage, a video display device and one of multiple selected video display adapter cards. A text data file is generated, utilizing either a utility program, or manufacturer provided information, which specifies video adapter information for a specific video adapter card including: an identification of the particular video adapter; port addresses and indices; commands necessary to lock and unlock extended video registers; data which describes video mode resolutions and colors; and the necessary commands and data to enable selected video modes to be set and stored. A video display device driver is then provided which is capable of accessing and parsing the text data files and which creates multiple command structures in response thereto. Each time a video state is required as a result of a session being initiated, terminated or transferred to background or foreground status, the appropriate command structure is utilized to determine and set a particular group of registers, store the status of the current registers and/or return the video adapter to a known stable state. The command structures are implemented utilizing an inverted linked list of commands which may be traversed in a direct or inverted manner to efficiently set or retrieve the state of the video adapter.

12 Claims, 4 Drawing Sheets

VIDEO DISPLAY ADAPTER CONTROL SYSTEM

BACKGROUND OF THE INVENTION

1. Technical Field

The present invention relates in general to an improved data processing system and in particular to an improved method and system for generating high resolution graphics in a data processing system. Still more particularly, the present invention relates to a method and system for supporting multiple display adapters which may be installed within a data processing system.

2. Description of the Related Art

Computer display systems have become increasingly complex in recent years. This is particularly true with respect to the so-called "personal" computer. Since its initial introduction the personal computer has gradually enhanced the video graphic capability of such systems to permit personal computers to meet more sophisticated demands in the display area.

Initially, personal computers often utilized Color Graphics Adapters or CGA capable of a resolution of 640×200 pixels and up to four colors. These adapters were quickly supplanted by so-called "Enhanced Graphics Adapters" (EGA) capable of a resolution of 640×350 pixels while displaying up to sixteen colors, out of a possible list of sixty-four colors.

In recognition of a demand for improved video graphic capability within personal computers International Business Machines Corporation introduced the PS/2 personal computer in 1987 which adopted a new graphic standard. This standard is the Video Graphics Array (VGA) which was capable of a resolution of 640×480 pixels, while displaying up to 256 colors simultaneously out of a color palette of over 250,000 colors. Unlike the previous Enhanced Graphics Adapter (EGA), the new standard is able to both read and write hardware registers and was quickly adopted as the industry standard, providing a substantial improvement in the video display art. Numerous manufacturers have provided so-called "video adapter" boards which were capable of reproducing the Video Graphics Array (VGA) mode within existing computers.

More recently, this Video Graphics Array (VGA) mode has been surpassed by the so-called "Super Video Graphics Array" (SVGA) mode is capable of providing a resolution of 1,024×768 pixels and 256 colors. Numerous manufacturers now provide video adapters capable of supporting this highly enhanced video mode. For example, the Tseng Laboratories ET4000; ATI Technologies ATI28800; Headland Technology HT209; Trident Microsystems TVGA8900; Western Digital Imaging WD90C11; Cirrus Logic CL-GD5422; and, the IBM VGA256C.

In order to utilize one of these SVGA graphics adapters it is necessary to provide an appropriate device driver which is capable of determining and setting the necessary registers within the data processing system which are required to implement these resolutions. This is typically accomplished in the prior art by statically coding the necessary information into the device driver; however, this static approach is inadequate for many SVGA adapter types. Existing VGA adapters generally do not provide an extensive implementation of extended registers and there is also no mechanism for locking and unlocking extended registers, in the manner necessary to implement the SVGA resolution. Additionally, existing VGA adapters do not provide the implementation necessary for bank switching, which permits access to one megabyte of video memory or greater.

Thus, each of the aforementioned SVGA adapters requires a unique device driver capable of determining or setting the appropriate registers and locking and unlocking those registers. Additionally, data processing systems which utilize such SVGA adapters often also utilize standard VGA hardware and thus must necessarily switch back and forth between VGA operation and SVGA operation. This is particularly true in a multitasking data processing system which is capable of executing multiple applications in a plurality of concurrent sessions, wherein a single session is operated in foreground while the remaining sessions are operated in background. In such situations it is necessary to be able to save and restore the status of different sessions, each of which may be executing in a different resolution, in a single data processing system. Each of the aforementioned SVGA adapters provides a device driver capable of accomplishing several of these tasks; however, the utilization of each such SVGA adapter requires the installation of a unique device driver for that adapter.

It should thus be apparent that a need exists for a device driver which is capable of supporting a plurality of different SVGA adapters and which is capable of supporting a selection of different video modes for utilization in different sessions within a multitasking data processing system.

SUMMARY OF THE INVENTION

It is therefore one object of the present invention to provide an improved data processing system.

It is another object of the present invention to provide an improved method and system for generating high resolution graphics in a data processing system.

It is yet another object of the present invention to provide an improved method and system for supporting multiple diverse display adapters which may be installed within a data processing system.

The foregoing objects are achieved as is now described. A video display adapter control system is provided for utilization within a data processing system which includes a processor, data storage, a video display device and one of multiple selected video display adapter cards. A text data file is generated, utilizing either a utility program, or manufacturer provided information, which specifies video adapter information for a specific video adapter card including: an identification of the particular video adapter; port addresses and indices; commands necessary to lock and unlock extended video registers; data which describes video mode resolutions and colors; and the necessary commands and data to enable selected video modes to be set and stored. A video display device driver is then provided which is capable of accessing and parsing the text data files and which creates multiple command structures in response thereto. Each time a video state is required as a result of a session being initiated, terminated or transferred to background or foreground status, the appropriate command structure is utilized to determine and set a particular group of registers, store the status of the current registers and/or return the video adapter to a known stable state. The command structures are implemented utilizing an inverted linked list of commands which may be traversed in a direct or inverted manner to efficiently set or retrieve the state of the video adapter.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
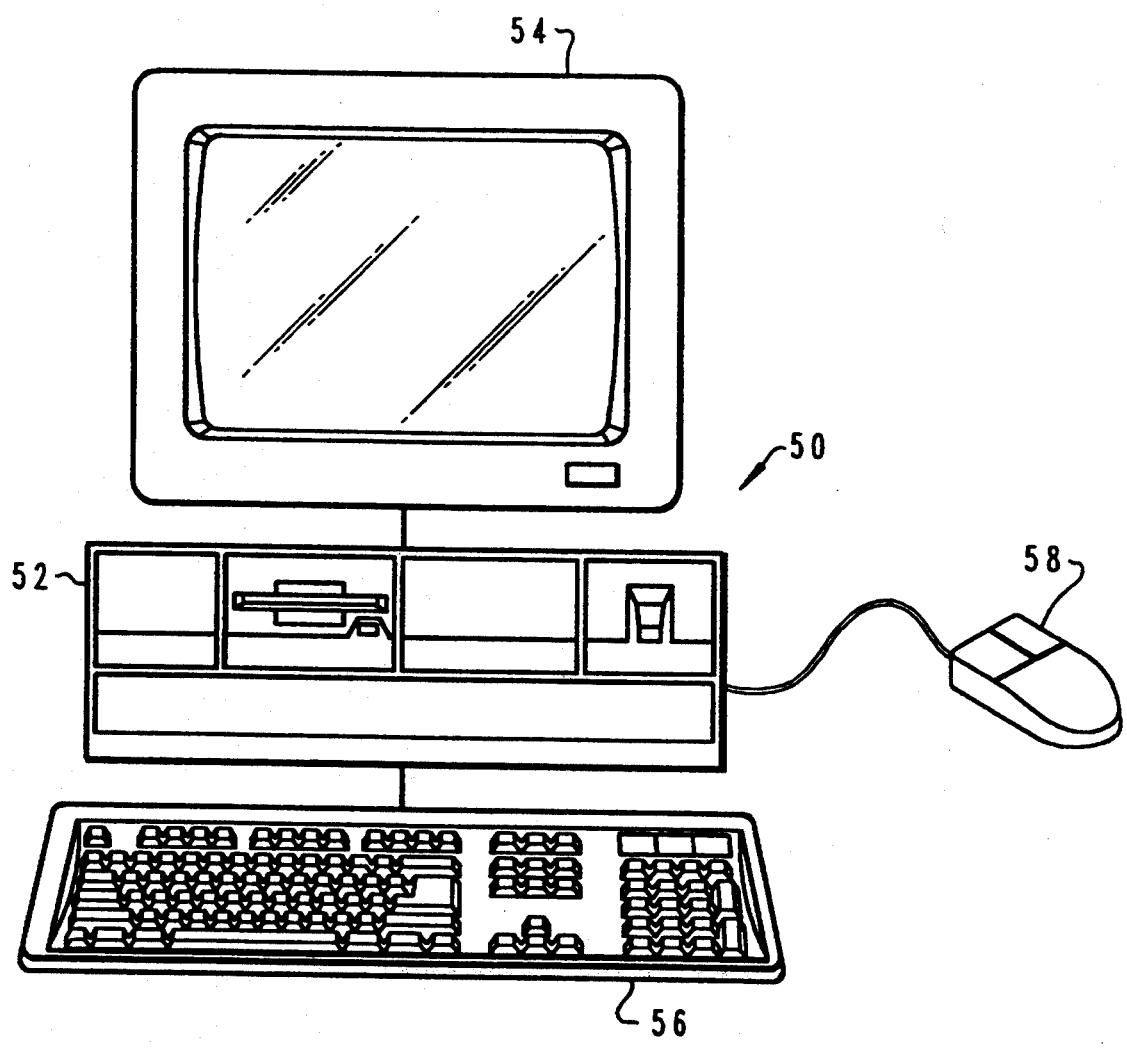
FIG. 1 is a pictorial representation of a data processing system which may be utilized to implement the method and system of the present invention.

With reference now to the figures and in particular with reference to FIG. 1, there is depicted a pictorial representation of a data processing system in which the present invention may be implemented in accordance with a preferred embodiment of the present invention. A personal computer 50 is depicted which includes a system unit 52, a video display terminal 54, a keyboard 56, and a mouse 58. Personal computer 50 may be implemented utilizing any suitable computer such as an IBM PS/2 computer, a product of International Business Machines Corporation, located in Armonk, N.Y. "PS/2" is a registered trademark of International Business Machines Corporation, located in Armonk, N.Y. Although the depicted embodiment involves a personal computer, a preferred embodiment of the present invention may be implemented in other types of data processing systems, such as for example, intelligent work stations or mini-computers.

Figure 2:
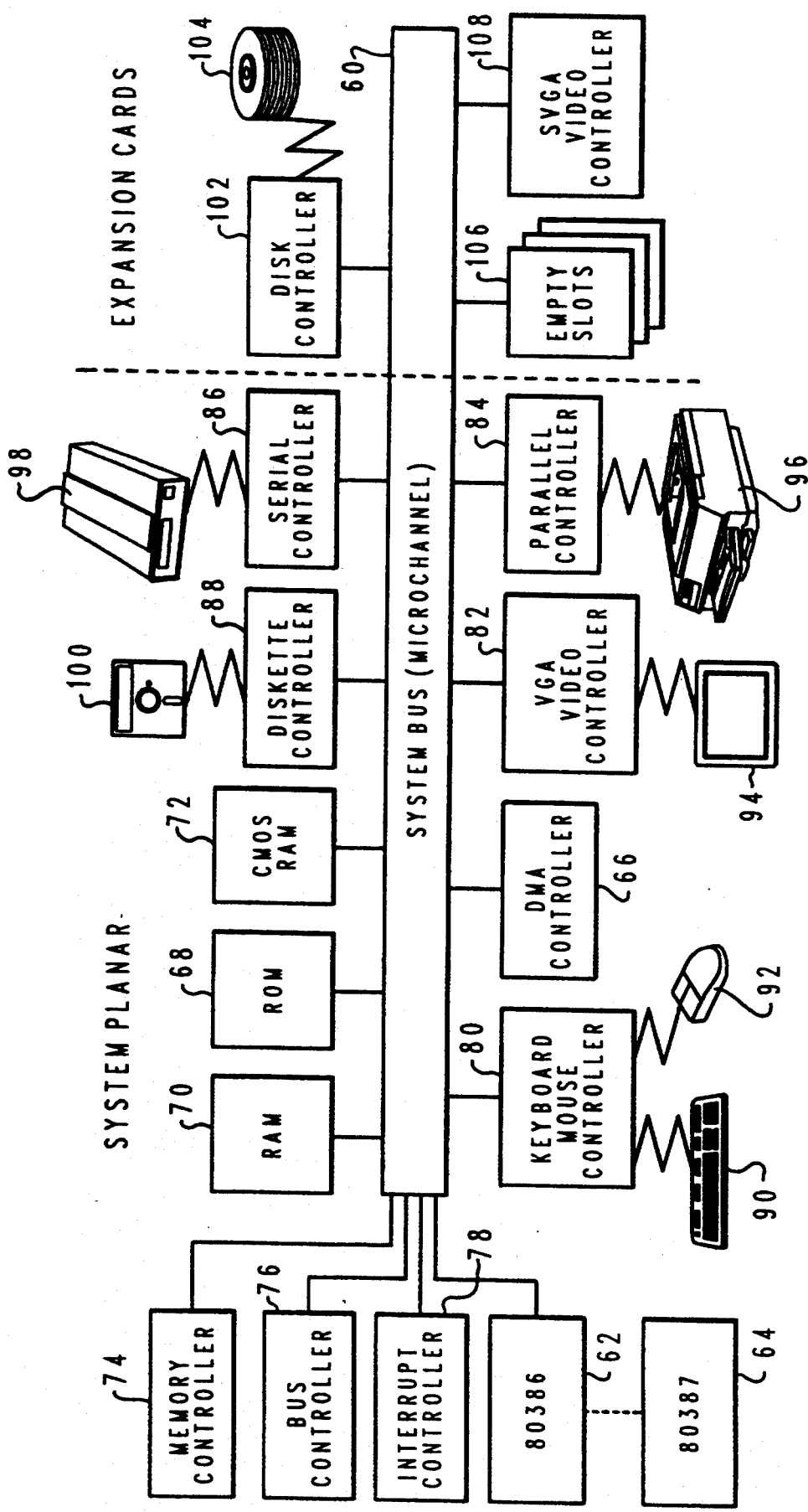
FIG. 2 is a high level block diagram of the data processing system of FIG. 1, which may be utilized to implement the method and system of the present invention.

Referring now to FIG. 2, there is depicted a block diagram of selected components in personal computer 50 in which a preferred embodiment of the present invention may be implemented. System unit 52 preferably includes a system bus 60 for interconnecting and establishing communication between various components in system unit 52. Microprocessor 62 is connected to system bus 60 and also may have numeric coprocessor 64 connected to it. System bus 60 may be a Micro Channel system bus from International Business Machines Corporation. "Micro Channel" is a registered trademark of International Business Machines Corporation. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard. Read only memory (ROM) 68 is mapped into the microprocessor 62 address space in the range from 640K to 1 megabyte. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input-/output (I/O) controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards also may be added to system bus 60, such as disk controller 102, which provides a hardware interface for hard disk unit 104. Empty slots 106 are provided so that other peripherals, adapters, and devices may be added to system unit 52. For example, a Super Video Graphic Array (SVGA) controller card 108 is depicted as coupled to system bus 60. As described above, many different manufacturers provide such SVGA adapter cards and it is an object of the present invention to permit a single display adapter control system to efficiently accommodate any one of multiple such adapters without requiring specialized device drivers.

Those skilled in the art will appreciate that the hardware depicted in FIG. 2 may vary for specific applications. For example, other peripheral devices such as: optical disk media, audio adapters, or chip programming devices such as a PAL or EPROM programming device, and the like also may be utilized in addition to or in place of the hardware already depicted.

Figure 3:
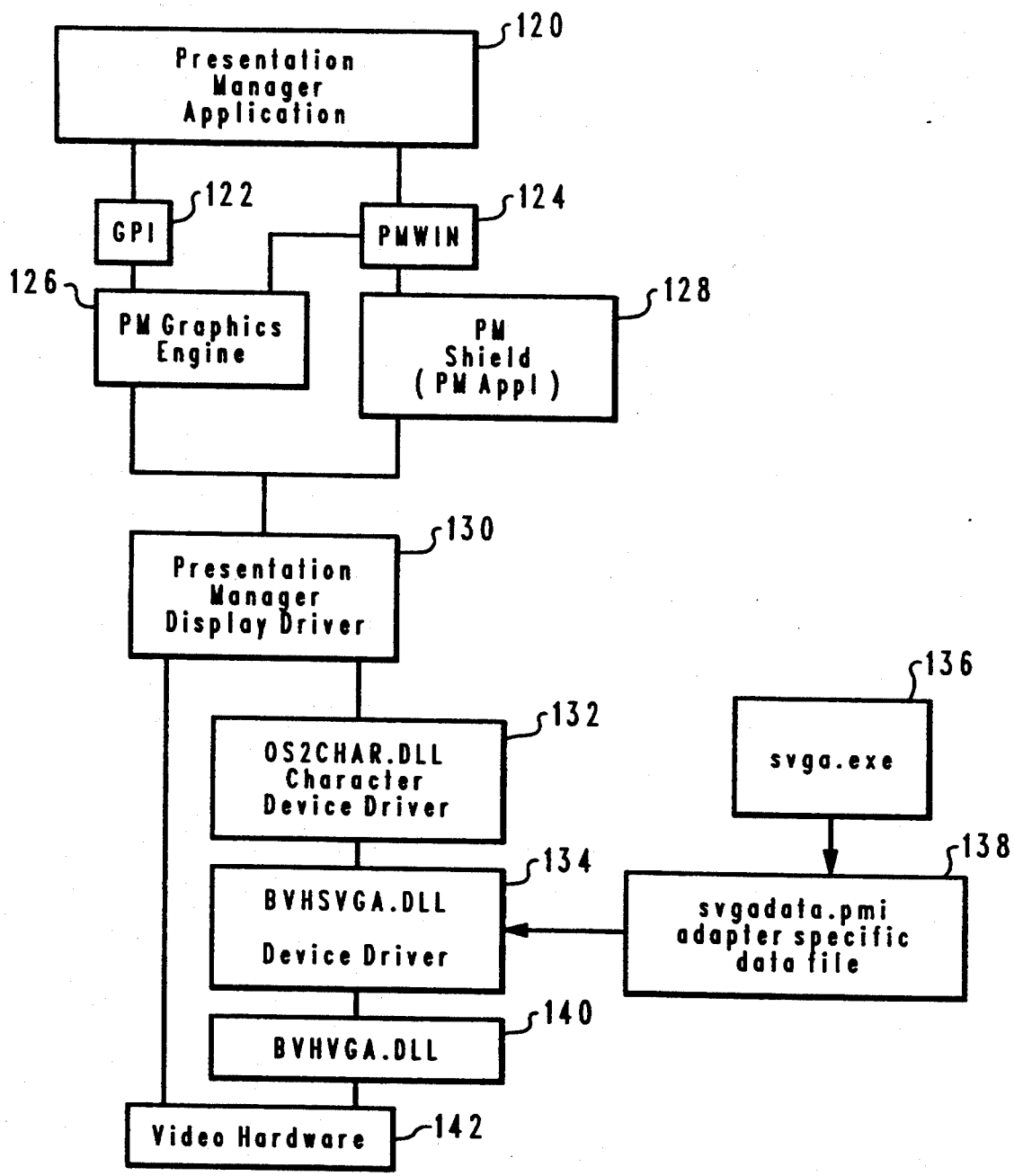
FIG. 3 is a high level block diagram of selected software modules which may be utilized to implement the method and system of the present invention.

With reference now to FIG. 3, there is depicted a high level block diagram of selected software modules which may be utilized to implement the method and system of the present invention. As illustrated, a graphics application, such as the International Business Machines Corporation Presentation Manager Application is depicted, at reference numeral 120. In a manner well known to those having skill in such applications, Presentation Manager application 120 is coupled to a graphical programming interface 122 and a Presentation Manager window manager 124. Graphical programming interface (GPI) 122 then makes subroutine calls to the graphics engine 126 and together with Presentation Manager Shield application 128 provides outputs to display driver 130.

Display driver 130 can then couple selected signals to video hardware 142 directly or via a character device driver such as OS2CHAR.DLL. Next, in accordance with an important feature of the present invention, an adaptable video display adapter device driver 134 is provided. In a manner which will be explained in greater detail herein, this device driver may be utilized to access and parse a text file in order to create one or more command structures, which may be then utilized to support one of several display adapters. For example, a utility program "svga.exe" can be run within the OS/2 operating system to generate the data file "svgadata.pmi," as indicated at reference numeral 138.

This file contains adapter specific information with regard to an identification of the manufacturer of a particular VGA adapter, the particular chip set to which this data pertains, port addresses and indices, commands to execute upon leaving a video mode, commands to lock and unlock extended registers and data for one or more mode resolutions and number of colors, in addition to those commands and data which are necessary to enable a specified video mode to be set or restored.

This information is then accessed and parsed by device driver 134 and utilized to create one or more command structures which will be described in greater detail herebelow. These command structures are, in a preferred embodiment of the present invention, linked list command structures which may be inverted in order to retrieve the state of a video adapter when the state must be saved. Thus, an attempted presentation of high resolution graphics within data processing system 50 will result in the system attempting to utilize the SVGA mode and in the event that video mode is not required for the display the standard VGA driver will be utilized, as indicated at reference numeral 140. Thus, the commands and instructions contained within the linked list instruction set may be coupled to video hardware 142, to provide a high resolution graphics output, in a manner which will be explained in greater detail herein.

Each mode entry contained within the created command structure in the data file consists of multiple sections, which each contain the information described above. There are simple rules which govern the operation of each section. For example, "pseudo-registers" or interpreter registers within each section are only valid for the duration of that section. The interpreter registers are initialized and operated on by putting an entry into the file. An entry such as "RO=0×12" results in a linked list entry. When processed that entry will cause the corresponding internal register to be set to the value of "12" hexadecimal. A number of bitwise operations are available for any register such as: AND; OR; XOR; and, left and right shifts. Thus, a subsequent entry may be utilized to OR the internal register with a specified value. For example, as set forth below within Table 1, the sequence depicted therein will write the value "82" hexadecimal to the Graphics Data Controller (GDC) register "Oe" hexadecimal.

TABLE 1

```
r14 = 0x00;
r14 | = 0x80;
r14 ≡ 0x02;
boutb(1, 0x0e, 0x3ce, 0x3cf);
```

As illustrated in Table 1, GDC index "0×0e" is written with the value "0×82" which is perhaps recognizable as a bank set for the Trident 8900 chip set. A save state would reverse the BOUTB command to read GDC "0×0e," and then store that value in place of the assignment "r14=0×00." Restoring the register then has the desired effect, where bit 1 needs to be exclusive ORed (XOR) prior to writing.

A set mode, internally, involves passing the list to a ring 2 routine, thus eliminating multiple ring transitions. The processing is "raw" in that no sequence of resets are done on behalf of the caller. Previously any commands which accessed sequencers were necessarily bracketed by a sequencer reset. It is now possible to specify within the data file exactly what is required. One exception to this is made for Attribute Controller ATC registers where the status port will be read to reset the flip-flop.

Restoring the adapter state is essentially a mode set; however, the hardware registers must be updated in some fashion. Most of the data file consists of register assignments followed by a BOUTB type command. To ensure that the adapter state is restored correctly, a save operation processes the list in an inverted manner. All BOUTB commands are inverted and become BINB commands, with all other operations treated as non-operations for purposes of the save. This sequence is illustrated within Table 2.

TABLE 2

```
/*
 *   Set CRT Registers
 */
outw(0x3d4, 0x0e11); /* unprotect CRTs 0-7 */
r0  = 0xa1;   r1  = 0x7f;   r2  = 0x80;   r3  = 0x84;   r4  = 0x82;
r5  = 0x94;   r6  = 0x24;   r7  = 0xf5;   r8  = 0x80;   r9  = 0x60;
r10 = 0x40;   r11 = 0x00;   r12 = 0x00;   r13 = 0x00;   r14 = 0xff;
r15 = 0x00;   r16 = 0x04;   r17 = 0x88;   r18 = 0xff;   r19 = 0x80;
r20 = 0xeo;   r21 = 0xff;   r22 = 0x24;   r23 = 0xab;   r24 = 0xff;
boutb(25, 0x00, 0x3d4, 0x3d5);
```

As depicted Table 2, the sequence therein when processed will unprotect the first eight Cathode Ray Tube CRT registers and then program the remaining registers to the appropriate state. A save operation that ignores the first OUTW and reverses the BOUTB to become a BINB. This operation then updates the list stored register assignment entries to those values which were just read from the hardware. A subsequent restore of this video state will then load these new values into the registers prior to programming the hardware, by virtue of the save operation.

Next, Table 3 illustrates the internal "C" style structure representation for the linked list command structure.

TABLE 3

| TYPEDEF STRUCT_hwcommand { | | | |
|---|---|---|---|
| USHORT | usCommand; | /* Type of IO command PMICMD_* | */ |
| USHORT | usFlags; | /* Flags eg. Auto-increment. | */ |
| USHORT | usIndexPort; | /* Index Port Address | */ |
| USHORT | usDataPort; | /* Data port - 0 if non-indexed | */ |
| USHORT | usStartReg; | /* Start indexed-register | */ |
| USHORT | usNumRegs; | /* Number of registers | */ |
| USHORT | usANDMask; | /* AND mask for RMW commands | */ |
| USHORT | usORMask; | /* OR mask for RMW commands | */ |
| USHORT | usData; | /* Immediate data for OUTB/OUTW | */ |
| struct _HWCOMMAND NEAR * pNextCmd; | | /* Next command, NULL if none | */ |
| struct _HWCOMMAND NEAR * pPrevCmd; | | /* Previous cmd, NULL If none | */ |
| } HWCOMMANDM FAR * FPHWCOMMAND, NEAR * NPHWCOMMAND; | | | |

Next, referring to Table 4, there is depicted a listing of a command sequence utilized in accordance with the method and system of the present invention. Each of the commands utilized within a command structure is set forth with the appropriate syntax to accomplish the method and system of the present invention.

TABLE 4

Figure 4:
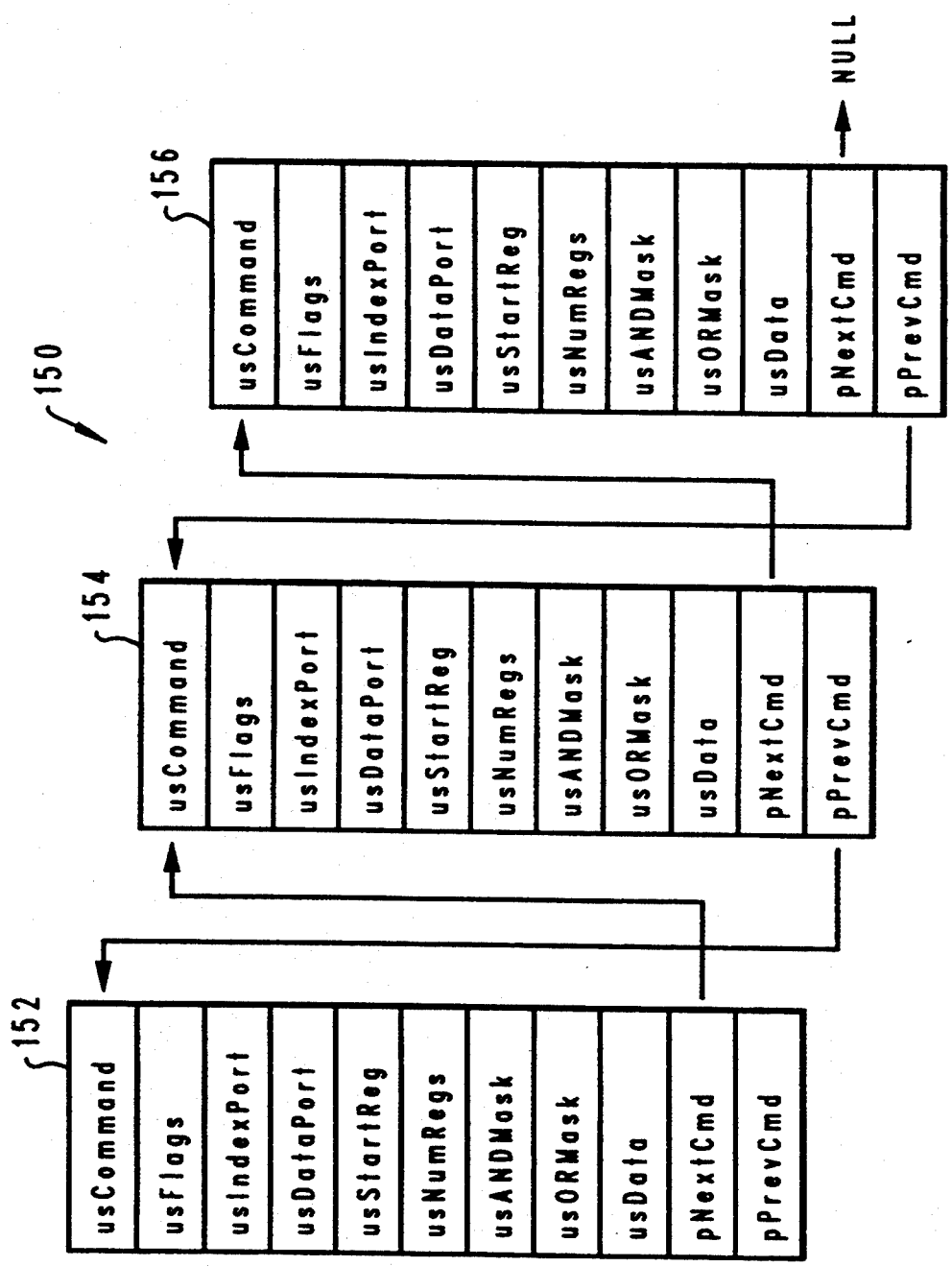
FIG. 4 is a graphic representation of an invertible linked-list command structure which may be utilized to implement the method and system of the present invention.

INB(<Variable>, <IO Port>);
/* Input a byte of data. eg: INB(r12, 0x3da); */
INW(<Variable>, <IO Port>);
/* Input a word of data. eg: INB(r12, 0x3da); */
OUTB(<IO Port>, <data byte> | <Variable>);
/* Output of a byte of data to a port. */
OUTW(>IO Port>, <data word> | <Variable>);
/* Output a word of data to a port. */
BINB(<no of values>, <start index>, <Index Port>, <Data Port>);
/* Input a sequence of bytes from an indexed port. */
BOUTB(<no of values>, <start index>, <Index Port>, <Data Port>);
/* Output of a sequence of bytes to an indexed port. f*/
RMWB(<Index Port>, <Data Port>, <index>, <AND Mask>, <OR Mask>);
/* Read, Modify and Write a byte to an indexed port. */
RMWW(<Read Port>, <Write Port>, <AND Mask>, <OR Mask>);
/* Read, Modify and Write a byte to a non-indexed port. */
The BOUTB( ) and BINB( ) commands operate implicity on the previously assigned registers.
WAIT(<status port>m <test mask>, <count>, <timeout>, <0|1>);
/*
* Read status port until bits in test mask are set/clear.
*
*Parameters:
*   <status port>      - byte port to be read
*   <test mask>        - mask value to AND with data byte read
*   <count>            - no of times to wait for condition
*   <timeout>          - inner loop count 0-0xffff (0 => 0x10000)
*   <0|1>              - wait for condition to be clear/set
*
*   Wait(0x3da, 0x08, 1, 0, 1); wait until vert retrace starts
*   Wait(0x3da, 0x08, 1, 0, 0); wait until vert retrace ends Next, with reference to FIG. 4, there is depicted a graphic representation of an invertible linked-list command structure which may be utilized to implement the method and system of the present invention. As illustrated, the command structure 150 comprises three linked list structures 152, 154, and 156. In the direct processing of these linked list structures, each command is executed serially and upon completion of each linked list, the "Next Command" instruction is utilized to access the next element within the linked list structure. In this manner, complex administration need not be provided and the process by which a video mode is established or saved for later retrieval may be simply implemented upon reference to the appropriate command structure. By dynamically inverting the operations of a set mode to retrieve the state of a video mode that state may be saved for later restoration. In such instances, each structure within the linked list is traversed in order and the "Previous Command" instruction is utilized to reference each structure to the preceding structure within the linked list command structure. Thus, the determining and setting of the required data to establish a video mode, as well as the manner by which that information may be saved and stored in order to retrieve the state of a video adapter, is efficiently accomplished.

Within Appendix A attached hereto, a single video mode entry example from a text data file is illustrated. Of course, those skilled in the art will appreciate that the format and syntax of such a text data file may vary and still be implemented within the spirit and intent of the present invention. The order, format and syntax of the information contained within the text data file need only be presented in a manner which may be accessed and parsed by the device driver, such that the utilization of an alternate Super Video Graphics Array (SVGA) adapter may be utilized by simply altering or referring to an alternate text data file, without the requirement of utilizing a new device driver for each video adapter.

While the invention has been particularly shown and described with reference to a preferred embodiment, it will be understood by those skilled in the art that various changes in form and detail may be made therein without departing from the spirit and scope of the invention.

APPENDIX A

[ COMMENT]

Graphics Mode: 640 x 480 x 256 colors

[AdapterType]

TSENG

[ChipSet]

ET400

[ModeInfo]

ModeAttributes    =    0x18

| | | |
|---|---|---|
| BytesPerScanLine | = | 80 |
| XResolution | = | 640 |
| YResolution | = | 480 |
| TextRows | = | 30 |
| BitsPerPixel | = | 8 |
| NumberOfPlanes | = | 1 |
| PageLength | = | 307200 |
| SaveSize | = | 307200 |
| InterlaceMode | = | 1 |
| BufferAddress | = | 0x0a0000 |

[TrapRegs]

0x3c2;

0x3bf;

0x3d8;

0x3cd;

0x3c4; 0x00-0x04, 0x06-0x07;

0x3c5;

0x3d4, 0x00-0x18, 0x34-0x35;

0x3d5;

0x3c0, 0x00-0x14, 0x16-0x16;

0x3c1;

0x3ce, 0x00-0x08;

0x3cf;

[Cleanup]

rmwb (0x3c4, 0x3c5, 0x07, 0x00, 0xbc);

rmwb (0x3d4, 0x3d5, 0x34, 0x00, 0x00);

rmwb (0x3d4, 0x3d5, 0x35, 0x00, 0x00);

[Lock]

```
/*
 *      Lock extended registers.
 */ outb(0x3bf, 0x01);
   outb(0x3d8, 0x29);

[UnLock]

/*
 *      Unlock extended registers.
 */ outb(0x3bf, 0x03);
   outb(0x3d8, 0xa0);

[SetMode]

/*
 *      Set miscellaneous output register.
 */ outb(0x3c2, 0xe3);

/*
 *      Unlock extended registers.
 */ outb(0x3bf, 0x03);
   outb(0x3d8, 0xa0);
   outb(0x3cd, 0x00);

/*
 *      Set sequencer registers.
 */ r0   = 0x03; r1   = 0x01; rs   - 0x0f; r3    = 0x00; r4   = 0x0e;
   boutb(5, 0x00, 0x3c4, 0x3c5);
``` r6    = 0x00; r7   = 0xbc;

boutb(2, 0x06, 0x3c4, 0x3c5);

/*
*    Set CRT registers.
*/ r17   = 0x0e;

boutb(1, 17, 0x3d4, 0x3d5);

| r0 | = | 0x5f; r1 | = 0x4f; r2 | = 0x50; r3 | = 0x82; r4 | = 0x54; |
|---|---|---|---|---|---|---|
| r5 | = | 0x80; r6 | = 0x0b; r7 | = 0x3e; r8 | = 0x00; r9 | = 0x40; |
| r10 | = | 0x10; r11 | = 0x00; r12 | = 0x00; r13 | = 0x00; r14 | = 0x00; |
| r15 | = | 0x00; r16 | = 0xea; r17 | = 0x8c; r18 | = 0xdf; r19 | = 0x50; |
| r20 | = | 0x60; r21 | = 0xe7; r22 | = 0x04; r23 | = 0xab; r24 | = 0xff; | boutb(25, 0x00, 0x3d4, 0x3d5);

r52   = 0x00; r53   = 0x00 boutb(2, 0x34, 0x3d4, 0x3d5);

/*
*    Set attribute registers.
*/

| r0 | = | 0x00; r1 | = 0x01; r2 | = 0x02; r3 | = 0x03; r4 | = 0x04; |
|---|---|---|---|---|---|---|
| r5 | = | 0x05; r6 | = 0x06; r7 | = 0x07; r8 | = 0x08; r9 | = 0x09; |
| r10 | = | 0x0a; r11 | = 0x0b; r12 | = 0x0c; r13 | = 0x0d; r14 | = 0x0e; |
| r15 | = | 0x0f; r16 | = 0x01; r17 | = 0x00; r18 | = 0x0f; r19 | = 0x00; |
| r20 | = | 0x00; | | | | | boutb(21, 0x00, 0x3c0, 0x3c1);

r22   = 0x00 boutb(1, 0x16, 0x3c0, 0x3c1);

```
/*
 *    Set GDC registers.
 */ r0   =    0x00; r1   = 0x00; r2  = 0x00; r3   = 0x00; r4   = 0x00;
r5   =    0x40; r6   = 0x05; r7  = 0x0f; r8   = 0xff;
boutb(9, 0x00, 0x3ce, 0x3cf);
```

What is claimed is:

1. A display adapter control system for utilization in a data processing system, said data processing system including a processor, data storage, a video display device and a selected one of a plurality of video adapters, each of said plurality of video adapters utilizing a diverse group of specified registers within said data processing system to provide a high resolution display within said video display device, said display adapter control system comprising:
   a text data file within said data processing system including specific data associated with said selected one of said plurality of video adapters;
   a video display device driver within said data processing system, said video display device driver including means for accessing and parsing said text data file and for creating at least one command structure in response thereto; and
   mode control means associated with said video display device driver for determining and setting a particular group of specified registers within said data processing system utilizing said at least one command structure.

2. The display adapter control system according to claim 1, wherein said data processing system comprises a multitasking data processing system capable of simultaneous execution of multiple applications within a plurality of concurrent sessions, wherein one of said plurality of concurrent sessions operates in foreground while all remaining concurrent sessions operate in background, and wherein said mode control means determines and sets a group of specified registers in response to an establishment of a session in foreground.

3. The display adapter control system according to claim 2, wherein said at least one command structure comprises a linked list of commands and instructions which are processed by said video display device driver in a direct order in response to an establishment of a session in foreground and in an inverted order in response to a switching of said session into background.

4. The display adapter control system according to claim 1, wherein said text data file includes an identification of said selected one of said plurality of video adapters.

5. The display adapter control system according to claim 1, wherein said text data file includes an identification of selected commands utilized to lock and unlock said particular group of specified registers within said data processing system.

6. The display adapter control system according to claim 1, wherein said text data file includes an identification of at least one selected resolution and a selected number of colors to be utilized with said selected one of said plurality of video adapters.

7. A display adapter control system for utilization in a multitasking data processing system, said data processing system capable of simultaneous execution of multiple applications within a plurality of concurrent sessions wherein one of said plurality of concurrent sessions operate in foreground while all remaining concurrent sessions operate in background, said data processing system including a processor, data storage, a video display device and a selected one of a plurality of video adapters, each of said plurality of video adapters utilizing a diverse group of specified registers within said data processing system to provide a high resolution display within said video display device, said display adapter control system comprising:
   a text data file within said data processing system including specific data associated with said selected one of said plurality of video adapters;
   a video display device driver within said data processing system, said video display device driver including means for accessing and parsing said text data file and for creating at least one clean up command structure in response thereto; and
   mode control means associated with said video display device driver for updating and setting a particular group of specified registers within said data processing system utilizing said at least one clean up command structure in response to a transition of a concurrent session into background.

8. The display adapter control system according to claim 7, wherein said text data file includes an identification of said selected one of said plurality of video adapters.

9. The display adapter control system according to claim 7, wherein said text data file includes an identification of selected commands utilized to lock and unlock said particular group of specified registers within said data processing system.

10. The display adapter control system according to claim 7, wherein said text data file includes an identification of at least one selected resolution and a selected number of colors to be utilized with said selected one of said plurality of video adapters.

11. The display adapter control system according to claim 7, wherein said video display device driver also creates a command structure which comprises a linked list of commands and instructions which are processed by said video display device driver in a direct order in response to an establishment of a session in foreground and in an inverted order in response to a switching of said session into background.

12. A method for providing a high resolution display in a data processing system having a processor, data storage, a video display device and a selected one of a plurality of video adapters, each of said plurality of video adapters utilizing a diverse group of specified registers within said data processing system, said method comprising the steps of:

creating a text data file within said data processing system including specific data associated with said selected one of a plurality of video adapters within said data processing system;

utilizing a video display device driver within said data processing system to access and purse said text data file;

automatically creating at least one command structure in response to said accessing and pursing of said text data file; and determining and setting a particular group of specified registers within said data processing system utilizing said at least one command structure.

* * * * *